United States Patent [19]

Giunchi et al.

[11] Patent Number: 5,164,346
[45] Date of Patent: Nov. 17, 1992

[54] CERAMIC PREFORMS HAVING HIGH MECHANICAL STRENGTH, A PROCESS FOR THEIR PREPARATION AND METAL MATRIX COMPOSITES OBTAINED FROM SAID CERAMIC PREFORMS

[75] Inventors: Giovanni Giunchi, Novara; Andrea Adembri, Florence, both of Italy

[73] Assignee: Keramont Italia, S.p.A., Milan, Italy

[21] Appl. No.: 519,434

[22] Filed: May 4, 1990

[30] Foreign Application Priority Data

May 5, 1989 [IT] Italy ............................ 20378 A/89

[51] Int. Cl.$^5$ ..................... C04B 35/02; C04B 35/58
[52] U.S. Cl. ........................ 501/95; 501/96; 501/97
[58] Field of Search ............ 501/95, 96, 97, 98; 269/60, 43

[56] References Cited

U.S. PATENT DOCUMENTS

| | | | |
|---|---|---|---|
| 4,388,255 | 6/1983 | Simpson | 264/60 |
| 4,579,699 | 4/1986 | Verzemnieks | 264/43 |
| 4,769,349 | 9/1988 | Hillig et al. | 501/95 |
| 4,994,418 | 2/1991 | Yamakawa et al. | 501/95 |

FOREIGN PATENT DOCUMENTS 2132596 7/1984 United Kingdom .................. 501/97

OTHER PUBLICATIONS

Chemical Abstract-JP 1083633 (Mar. 29 1989) "Manufacture of fiber preforms for metal composites" —Japan— Tokuse-inventor.

Primary Examiner—William R. Dixon, Jr.
Assistant Examiner—Paul Marcantoni
Attorney, Agent, or Firm—Stevens, Davis, Miller & Mosher

[57] ABSTRACT

Preforms for metal matrix composites consisting of ceramic material belonging to the class of oxides, nitrides, carbides, borides, oxynitrides and the like, prevailingly in an acicular form and having monocrystalline or polycrystalline structure, having a density ranging from 0.2 to 1.6 g/cm$^3$ and porosity ranging from 50 to 95%.

7 Claims, No Drawings

CERAMIC PREFORMS HAVING HIGH MECHANICAL STRENGTH, A PROCESS FOR THEIR PREPARATION AND METAL MATRIX COMPOSITES OBTAINED FROM SAID CERAMIC PREFORMS

FIELD OF THE INVENTION

The present invention relates to ceramic preforms having high mechanical strength for metal matrix composites and to the respective process for their preparation.

More particularly, the present invention relates to ceramic preforms having high mechanical strength for metal matrix composites to their respective preparation process and to their use for preparing shaped bodies according to technologies of infiltration, by molten metals, of injection, die-casting type and the like.

BACKGROUND OF THE INVENTION

It is already known for many years, to prepare composites having a metal, or optionally, plastic matrix, by using as reinforcement material, fibers or whiskers in ceramic material such as silicon carbide.

These composites can be prepared according to different technologies, for instance by mixing the fibrous material with metal powders and by subjecting the whole to a thermal treatment, generally under pressure, to melt the metal matrix. Alternatively, the ceramic fibrous material can be used for preparing porous preforms to be infiltrated by the molten metal according to known technologies.

Methods for preparing preforms based on fibers or whiskers are described in the literature such as, for instance, in U.S. Pat. Nos. 4,587,774 and 4,740,428.

According to these methods, preforms can be prepared suitable for infiltration by a molten metal, either by letting the whiskers grow directly in a porous mass or by dispersing the whiskers themselves in polar liquids such as alcohols, water, ketones and the like. Such dispersions can be additioned with a polymeric binding agent soluble in the aforesaid polar liquids and then poured into molds having the desired shape and turned into porous preforms after having removed, by heating or another technique, the solvent and the possible polymeric binder.

In both cases preforms are obtained, having a high porosity, consisting of an agglomerate of short fibers and/or whiskers having an unoriented distribution and in which a homogenous and uniform space distribution of the fibrous material cannot take place.

Such porous preforms can be infiltrated by a molten metal, for instance aluminum, giving rise to finished manufactures or to semifinished products, which are subsequently treated by customary metallurgic techniques.

The preforms obtained by the processes known to the prior art, however, are characterized by drawbacks, which make their use problematic for the preparation of metal matrix composite structures.

In particular, the high porosity, together with the lack of chemical bonds amid the porous material, give rise to very poor mechanical properties and to such brittleness as to prevent an easy handiness of said preforms.

Moreover, such brittleness involves considerable problems concerning the environment sanitation owing to the characteristics of the fibrous material the preshaped products consist of, mainly when the diameters are below one micrometer.

This drawback concerning the brittleness shows during the infiltration phase as well, as the molten metal can have a partial or total destructive action to the preform thereby the distribution of the fibrous material in the composite is not homogenous.

Therefore, to avoid such further drawbacks, sophisticated and consequently expensive infiltration techniques are required, such as metal spray, vapor deposition, vapor infiltration and so on.

Moreover, the composites obtained from these kinds of preforms are characterized in that they have isotropic mechanical properties, because the fibers or whiskers, acting as reinforcement element, are agglomerated in the preform with random distributions, thereby prevented from being able to prepare composites characterized by anisotropic mechanical properties. These anisotropic properties can be generally achieved by orientation of the reinforcement material at present obtained by subjecting the composite to mechanical actions at a high temperature, such as drawing, calendering and the like.

DETAILED DESCRIPTION OF THE INVENTION

The Applicant has now found preforms for metal matrix composites which do not present the above mentioned drawbacks, because they have very high mechanical properties, being the fibrous material bound by a ceramic phase, and because they are able to yield directly composites having mechanical properties of anisotropic type as well, as the fibrous material can be oriented according to the desired ways and measures.

Therefore, the object of the present invention consists in preforms for metal matrix composites based on a ceramic fibrous material bound chemically by one or more nitridic ceramic phases, having a density ranging from 0.2 to 1.6 g/cm$^3$, porosity ranging from 50 to 95%, and ultimate bending strength over 5 MN/m$^2$ and generally ranging from 10 to 20 MN/m$^2$.

The percent porosity of the preforms, object of the present invention, is determined by the following relationship:

$$\text{porosity} = \left(1 - \frac{d}{d_o}\right) \times 100$$

wherein d is the measured density of the preform and $d_o$ is the average density of the ceramic material the preform consists of. Ultimate bending strength is measured according to ASTM-D 790 standard.

The material, the preforms object of the present invention consist of, is a ceramic fibrous material, in an acicular form and having a monocrystalline or polycrystalline structure, bound by a crystalline ceramic material in the form of nitride. Examples of fibrous material are the whiskers, short fibers, fibrils and the like or mixtures thereof, whereas examples of binding crystalline ceramic material are aluminum nitride, silicon nitride or mixtures thereof.

The length of the short fibers and fibrils ranges from 0.01 to 10 mm and their diameter ranges from 1 to 50 micrometers. A literature example, in which the preparation is described of ceramic fibers and fibrils, is the article by A.R. Bunsell "Fiber reinforcements for composite materials" Vol. II, Elsevier, page 427 (1988).

The whiskers are generally obtained by reactions in vapor phase, according to well known techniques. An example of which is set forth in U.S. Pat. No. 3,754,075 and their diameters range from 0.1 to 10 micrometers, whereas their length is from 5 to 500 times as long as the diameter.

Any ceramic product, capable of being turned into fibrous material, can be used for the preparation of the present preforms. Use can be made, for instance, of oxides, nitrides, carbides, borides, oxynitrides and the like, such as alumina, titania, silica, zirconia, silicon nitride, titanium nitride, aluminum nitride, boron nitride, silicon carbide, boron carbide, titanium carbide, titanium boride, zirconium boride, aluminum boride, aluminum oxynitride, aluminum and silicon oxynitride and the like.

Silicon carbide or silicon nitride whiskers are the preferred fibrous material which is used as constituent material of the preforms object of the invention.

The preforms object of the present invention, can be obtained by evaporating a liquid based from a dispersion containing a ceramic fibrous material, a finely particled metal powder and a polymeric binding agent. Then the obtained product is treated at high temperature in the presence of nitriding gases.

More particularly, a process for the preparation of the preforms for metal matrix composites object of the present invention comprises:
  (a) preparing a dispersion in a liquid base containing a ceramic fibrous material and a finely particled metal powder, a polymeric binding agent and, optionally, a dispersing and/or plasticizing agent;
  (b) preparing elemental units by pouring the dispersion through a system orienting the fibrous material in a uniaxial way;
  (c) evaporating the liquid base from the poured elemental unit;
  (d) forming a semifinished product by overlapping and pressing more evaporated elemental units, according to thicknesses and profiles as desired for the preform;
  (e) treating the semifinished product for the degradation and/or debinding of the binding agent; and
  (f) heating at high temperature in the presence of a flow of a gas nitriding the product obtained at step (e).

When the preform consists of a single elemental unit as such, step (d) of the present process has not to be entertained.

According to a preferred embodiment of the process object of the present invention, the liquid base is selected either from water or from organic solvents such as ethanol, propanol, isopropanol, butanol and the like, ketones such as acetone, methylethylketone and the like, aromatic hydrocarbons such as benzene, toluene, xylenes and the like, chlorinated hydrocarbons such as methylene chloride, trichloroethylene, chloroform and the like or mixtures thereof.

The material consisting of ceramic fibrous phase, preferably whiskers, and of a metal powder is deagglomerated in the liquid base according to known techniques and is used in amounts ranging from 5 to 80% by weight on the whole of the dispersion, preferably from 10 to 50%.

The ratios by weight between metal powder and ceramic fibrous phase range from 0.05 to 5 preferably from 0.1 to 2. Metals particularly suitable for the metal powder are aluminum and silicon having granulometries below 100 micrometers and preferably below 40 micrometers.

The binding agent is preferably soluble in the dispersing liquid and is such as to allow to obtain, after evaporation of the liquid, flexible poured elemental units including the fibrous material. Examples of polymeric binders are polyolefins such as polyethylene, polypropylene, ethylene-propylene copolymers and the like, aromatic vinyl polymers such as polystyrene, vinyl polymers and copolymer such as polyvinyl alcohol, polyvinyl acetate, polyvinylbutyral and the like, the acrylic polymers such as methyl, ethyl, polyacrylate and polymethylmethacrylate and the like, celluloses such as carboxymethylcellulose and the like.

The polymeric binder is used in amounts ranging from 0.5 to 20% by weight on the whole of the composition and preferably from 1 to 15%.

It is possible to add to the dispersion, amounts, ranging from 0 to 20% by weight on the whole, of a dispersing and/or plasticizing agent of the type: organic phosphates such as alkyl and alkylaryl phosphates, phthalates such as dioctylphthalate, di-2-ethylhexylphthalate, dibutylphthalate and the like, esters of organic acids such as butyl stearate, butyl sebacate, dioctyl sebacate, dioctyl adipate, glyceryltrioleate and the like, polyols such as glycerol, sorbitol and the like, polyalkyleneoxides such as polyethyleneglycol and the like.

The thus obtained dispersion, having a viscosity ranging form 500 to 10,000 cPs, is poured, either under action of the pressure or not, through an orienting system to give rise to an elemental unit, in which the fibrous material is oriented in a unidirectional way. These elemental units can have different shapes, such as, for instance, filaments, tapes, sheets and so on, and can be obtained by known techniques, such as extrusion, calendering, rolling, tape casting and so on. Preferred elemental units, according to the present invention, are the laminates, such as tapes and sheets, obtained by tape casting. This technology is well known and is described in the article by James Reed "Introduction to the principles of ceramics processing" J. Wiley and sons, page 397 (1988).

In the case of elemental units having a laminar shape, the thickness is generally below 5 mm and ranges preferably from 0.05 to 3 mm.

The evaporation of the liquid is generally carried out in a thermoregulated environment and in a uniform way, to avoid tensions or fractures on the surface of the evaporated elemental unit.

More evaporated elemental units are overlapped and pressed to yield a semifinished product having the shape and size as the desired preform. To this purpose use can be made of molds, cores or supports shaped according to the desired preform and by pressing, preferably at temperatures which are near the softening temperatures of the polymeric binding agent.

As the elemental units contain the fibrous material which is oriented in a unidirectional way, the packing can be carried out trying that the whole fibrous material has the same orientation. In this case the obtained preforms are suitable to the preparation of metal matrix composites characterized by anisotropic mechanical properties.

The semifinished product obtained after packing of the single elemental units, can undergo a thermal treatment up to temperatures ranging from 300 to 500° C. for the degradation and debinding of the polymeric binding agent.

Alternatively the polymeric binding agent can be removed by a flow of supercritical gases. Examples of useful gases are: carbon dioxide or hydrocarbons such as ethane, propane and the like.

The product obtained after degradation and/or debinding of the binding agent is heated at temperatures up to 1,500° C. and generally ranging from 1,000 to 1,500° C., in the presence of a flow of at least a nitriding gas, such as nitrogen, nitrogen/hydrogen mixtures, ammonia, ammonia/nitrogen mixtures and so on.

According to a further alternative and in the case of thermal debinding, steps (e) and (f) of the process, object of the present invention, can be carried out in one step.

The performs in ceramic material obtained by the process, object of the present invention, can be used for preparing metal matrix composites by using technologies of the infiltration, injection, die-casting type and so on.

Metals or metalloids which can be used for preparing these composites are aluminum, silicon, magnesium, titanium, zirconium, zinc, tin, iron, nickel, chromium, antimony, lead, copper, gold, silver and the like or alloys thereof.

EXAMPLES

A few examples will be given hereinafter, by way of illustration but not of limitation, to better understand the present invention and to put it into practice.

EXAMPLE 1

According to a typical preparation use was made of silicon carbide whiskers, produced by TOKAI Company, having the following size: diameter $=0.3$–$0.5$ micrometers, and aluminum powder having a granulometry below 40 micrometers, 1.5 g of a dispersing agent (Hypermer-KDI produced by Imperial Chemical Industries Company) were dissolved in 300 g of a mixture consisting of trichloroethylene ethanol (2.6% by weight). After having dissolved the dispersing agent, 75 g of whiskers and 63 g of aluminum were added to the solution by stirring the whole by ultrasound.

Separately, in a polyethylene vessel with a narrow inlet having the capacity of 1 liter, a solution was prepared consisting of: 30 g of polyvinylbutyral Butvar 76 produced by Monsanto Company, 30 g of polyethyleneglycol having molecular weight 1500, 18 g of dioctyphthalate and 128 g of aforesaid solvent.

The whiskers and aluminum powder suspension and 650 g of silica balls having a diameter of 15 mm were introduced into the same vessel.

The suspension was stirred by a ball-milling for 6 hours, reaching a final viscosity of about 1500 cPs.

Laminates being 700 micrometers thick were prepared by using the thus obtained suspension, according to the tape casting technique. The laminates after removal of the solvent at room temperature, were cut out according to rectangular and circular shapes, overlapped and hot-pressed to form parallelepipeda and cylinders.

Such semifinished products underwent a thermal treatment up to 500° C. under a nitrogen flow and were kept at this temperature for about 1 hour and subsequently up to 1000° C. for 2 hours under an ammonia flow (10 1/h).

The thus obtained preform had density 0.8 g/cm$^3$, porosity 75%, uniaxial distribution of the whiskers, and ultimate bending strength of 10.5 MN/m$^2$. The nitridic binding phase is shown in the micrography of FIG. 1 (5000 enlargements); the disappearance of the metal aluminum phase and the appearance of the aluminum nitride phase were confirmed by X-ray diffraction method.

EXAMPLE 2

The preform of Example 1 was used to form composites with a 357 alloy consisting of aluminum/silicon magnesium (92.5/7/0.5) by injection of the molten metal under pressure.

The operating conditions were as follows:

| | |
|---|---|
| temperature of the melt: | 650° C. |
| temperature of the preform: | 600° C. |
| injection pressure: | 9 MPa |
| infiltration time: | 30 seconds |

Composites were obtained having the properties as set forth in the Table.

TABLE

Mechanical tests carried out on the composite relating to Example 2.

| PROPERTY (1) | A 357 ALLOY | COMPOSITE | |
|---|---|---|---|
| Vickers microhardness (200 g) (kg/mm$^2$) (ASTM E384-73) | 65.8 | 95 105 | (2) (3) |
| Coefficient of thermal expansion (50-30° C.) (10$^{-6}$°C.) (Perkin Elmer TMA 7 apparatus) | 21.6 | 14 16.5 | (2) (3) |
| Tensile strength (Mpa) (ASTM D638) | 200 | 270 | |

(1) Samples which did not undergo any thermal treatment
(2) Measure carried out in a direction parallel to the whiskers
(3) Measure carried out in a direction perpendicular to the whiskers.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

We claim:

1. A ceramic composite consisting of ceramic fibrous material bound chemically by one or more nitride ceramic phases having a density ranging from 0.2 to 1.6 g/cm$^3$, porosity ranging from 50 to 95% and ultimate bending strength over 5 MN/m$^2$ obtained by a process comprising:
   a) preparing a dispersion in a liquid base containing a ceramic fibrous material and a finely particled metal powder, a polymeric binding agent and, optionally, a dispersing and/or plasticizing agent;
   b) preparing elemental units by pouring the dispersion through a system orienting the fibrous material in a uniaxial way;
   c) evaporating the liquid base from the poured elemental unit;
   d) forming a semi-finished product by overlapping and pressing more evaporated elemental units, according to thicknesses and profiles for the composite to be formed;

e) treating the semi-finished product for the degradation and/or debinding of the binding agent; and f) heating at a high temperature, in the presence of a flow of nitriding gas, the product obtained in step e);

the weight ratio between the metal powder and the ceramic fibrous material ranging from 0.05 to 5, and the amount of binding agent ranging from 0.5 to 20 weight %, based on the whole composition.

2. A composite preforms according to claim 1, wherein the material, the composite consists of, is a fibrous ceramic material having acicular form and monocrystalline or polycrystalline structure, bound by a crystalline ceramic material in the form of nitride.

3. A composite according to claim 2, wherein the ceramic fibrous material is selected from the group consisting of whiskers, fibrils and mixtures thereof.

4. A composite according to claim 2, wherein the binding crystalline ceramic material is selected from the group consisting of aluminum nitrides silicon nitrides and mixtures thereof.

5. A composite according to claim 1, wherein the fibrous material is obtained from ceramic products selected from the group consisting of oxides, nitrides, carbides, borides and oxynitrides.

6. A composite according to claim 1, wherein the fibrous material consists of silicon carbide or silicon nitride whiskers.

7. A composite according to claim 1, wherein the ultimate bending strength is from 10 to 20 $MN/m^2$.

* * * * *